United States Patent Office 3,174,973
Patented Mar. 23, 1965

3,174,973
PIPERIDYL NORBORNANES
James W. Bolger, Canoga Park, and Benjamin M. Finger, Sherman Oaks, Calif., assignors, by mesne assignments, to Rexall Drug and Chemical Company, Los Angeles, Calif., a corporation of Delaware
No Drawing. Filed Apr. 15, 1963, Ser. No. 272,870
6 Claims. (Cl. 260—293)

This invention relates to compositions of matter classified in the art of chemistry as substituted norbornanes.

The invention sought to be patented is described as residing in the concept of a chemical compound having the formula

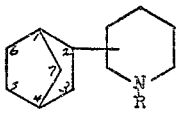

wherein R is selected from the group consisting of hydrogen, lower alkyl, hydroxy-lower alkyl, halo-lower alkyl, cyano-lower alkyl, amino-lower alkyl, carboxy-lower alkyl and guanidino-lower alkyl, and the acid addition and quaternary ammonium salts thereof.

As used throughout the specification and in the claims the terms "lower alkyl" and "lower alkylene" embrace both straight and branched chain alkyl and alkylene groups, respectively, containing from 1 to 4 carbon atoms, the term "halo" denotes the halogens chlorine, bromine, iodine and fluorine, the term "cyano" denotes the monovalent —C≡N radical, the term "amino" denotes the monovalent, basic —NH$_2$ group and its lower alkyl substituted derivatives, and the term "guanidino" denotes the monovalent organic radical —NH—C(:NH)NH$_2$.

The tangible embodiments of this invention possess the inherent general physical characteristics of being, in the form of their acid addition and quaternary ammonium salts, solid crystalline materials. Spectral and analytical data, taken together with the nature of the starting materials and the modes of synthesis, positively confirm the structure of the compounds sought to be patented.

The tangible embodiments of this invention possess the inherent applied use characteristics of having significant pharmacological activity as diuretic agents as determined by recognized and accepted pharmacological test procedures. In addition certain of the tangible embodiments of this invention possess the inherent applied use characteristics of being valuable as intermediates in the preparation of other tangible embodiments of the invention as will be described in detail hereinafter.

The manner and process of making and using the invention will now be generally described so as to enable a person skilled in the art of chemistry to make and use the same as follows:

The starting materials for the compounds of this invention are bicyclo [2,2,1] hept-5-enes (norbornenes) or bicyclo [2,2,1] heptanes (norbornanes) to which there is attached in the 2-position, by means of a carbon-to-carbon bond, a pyridyl radical. Such bicyclo [2,2,1] hept-5-enes may be readily prepared by treating cyclopentadiene with a vinyl pyridine as described by Petrov and Ludwig [Zhur. Ob. Khim. 25:739–44 (1955); J.G.C. USSR 25:703–7 (1955)—English Translation]. The bicyclo [2,2,1] heptane starting materials are described in our application entitled "Pyridyl Norbornanes," filed concurrently herewith.

In preparing the tangible embodiments of this invention represented by the formula

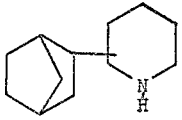

the bicyclo [2,2,1] hept-5-ene or bicyclo [2,2,1] heptane pyridyl substituted compound is subjected to a catalytic hydrogenation to saturate all existing double bonds. In the case of the former starting material, there is an uptake of 3 moles of hydrogen per mole of starting material, while with the latter, the hydrogen uptake is 4 moles per mole. The reaction is carried out by dissolving the starting material in an inert solvent, such as tetrahydrofuran, ethanol and the like, and then hydrogenating in the presence of a noble-metal catalyst, for example platinum, palladium and the like or mixtures thereof, preferably on a suitable catalyst support such as carbon. With active catalysts, such as palladium on carbon, the hydrogenation may be carried out to completion at room temperature. With a less active catalyst, for example Raney nickel, heating of the reaction mixture to about 100° C. to 150° C. may be required to carry the reaction to completion.

The piperidyl substituted bicyclo [2,2,1] heptanes thus obtained by the hydrogenation of the starting materials may be employed for the further preparation of a number of different N-substituted derivatives.

N-lower alkyl substituted piperidyl bicyclo [2,2,1] heptanes represented by the formula

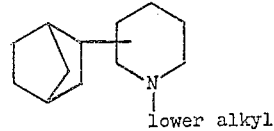

are conveniently prepared by treating the piperidyl-bicyclo [2,2,1] heptane with an appropriate alkylating agent such as, for example, methyl iodide, ethyl bromide or other similar alkyl halides, at from room temperature to reflux temperature in the presence of an inert solvent such as acetone, alcohol or benzene.

Alternately the N-lower alkyl piperidyl-bicyclo [2,2,1] heptanes may be prepared by catalytic hydrogenation of a lower alkyl quaternary pyridyl substituted bicyclo [2,2,1] hept-5-ene or bicyclo [2,2,1] heptane compound.

N-cyanoalkyl substituted piperidyl-bicyclo [2,2,1] heptanes represented by the formula

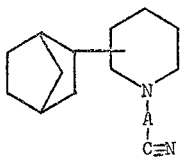

wherein A is lower alkylene are conveniently prepared by treatment of the piperidyl-bicyclo [2,2,1] heptane having a hydrogen substituent on the ring nitrogen with a cyanohydrin or an unsaturated nitrile having a terminal double bond, such as, for example, glycolonitrile or acrylonitrile at reflux temperature.

Alternately, such cyano substituted piperidyl-bicyclo [2,2,1] heptanes can be prepared by treating an appropriate N-haloalkyl substituted piperidyl-bicyclo [2,2,1] heptane, prepared as described hereinafter, with an alkali metal cyanide, such as, for example, sodium cyanide, according to the method described by Friedman and Schlechter (J. Org. Chem. 25:877 (1960).

The N-cyanoalkyl piperidyl-bicyclo [2,2,1] heptanes thus formed are conveniently employed as starting materials for the preparation of N-carboxyalkyl substituted piperidyl [2,2,1] heptanes represented by the formula

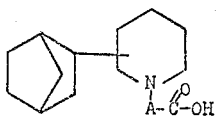

wherein A is lower alkylene. The conversion is readily accomplished by means of a basic hydrolysis of the N-cyanoalkyl compound. The N-carboxyalkyl compound may then be employed to prepare esters by conventional procedures.

N-hydroxyalkyl substituted piperidyl-bicyclo [2,2,1] heptanes represented by the formula

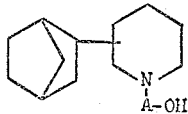

wherein A is lower alkylene are conveniently prepared by treating the piperidyl-bicyclo [2,2,1] heptane having a hydrogen substituent on the ring nitrogen with a halohydrin such as, for example, ethylene chlorohydrin, or an alkylene oxide such as, for example, ethylene oxide.

The N-hydroxyalkyl compound thus prepared when treated with a thionyl halide such as thionyl chloride or thionyl bromide or with hot hydrohalic acid such as hydrochloric or hydrobromic acid in the presence of an inert solvent such as methylene chloride, benzene and the like yield the corresponding N-haloalkyl substituted piperidyl-bicyclo [2,2,1] heptane represented by the formula

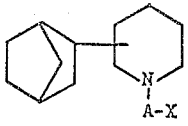

wherein A is lower alkylene and X is halogen.

N-aminoalkyl substituted piperidyl-bicyclo [2,2,1] heptanes represented by the formula

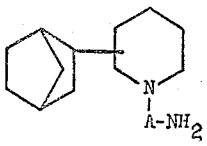

wherein A is lower alkylene are conveniently prepared from the corresponding N-haloalkyl compound with liquid ammonia at a temperature of from about 60° C. to about 160° C. in the presence of an organic solvent such as benzene, tetrahydrofuran, dimethyl sulfoxide, methanol, ethanol and the like. Other aminating agents which may be used in the place of liquid ammonia include ammonium hydroxide, dimethyl amine, diethylamine and the like.

Alternately the N-aminoalkyl compound may be prepared by treatment of the appropriate N-cyanoalkyl compound with an alkali metal aluminohydride such as lithium aluminum hydride in the presence of an inert solvent such as ether, tetrahydrofuran, and the like.

N-guanidino-lower alkyl substituted piperidyl-bicyclo [2,2,1] heptanes represented by the formula

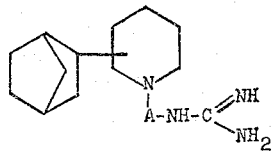

wherein A is lower alkylene are readily prepared from the corresponding N-amino-lower alkyl compound by treatment of the latter compound with a reagent capable of converting the primary amine into a "guanidino" grouping, such as, for example, S-lower alkyl-iso-thioureas, O-lower alkyl isoureas and the like, in the presence of a solvent such as water or a water-miscible solvent, for example, methanol, ethanol, isopropanol and the like, cyclic ethers as, for example, tetrahydrofuran, p-dioxane and the like. The reaction may be carried out at a temperature of from ambient temperature to the boiling point temperature of the solvent, and, if desired, in an atmosphere of an inert gas such as nitrogen.

The tangible embodiments of this invention can, if desired, be converted into their non-toxic pharmaceutically acceptable acid addition and quaternary ammonium salts by conventional means. Typical acid addition salts include the hydrochloride, hydrobromide, citrate, maleate, sulfate, nitrate and the like. Typical quaternary ammonium salts are those formed with such alkyl halides as methyl iodide, ethyl bromide, N-hexyl bromide and the like.

The tangible embodiments of this invention, either as the free base or in the form of a non-toxic pharmaceutically acceptable acid addition or quaternary ammonium salt, may be combined with conventional diluents and carriers, to form dosage forms such as tablets, capsules, solutions, suspensions, suppositories and the like.

The best mode contemplated by the inventors of carrying out this invention will now be set forth as follows:

EXAMPLE 1

2-(2-piperidyl)-bicyclo [2,2,1] heptane 2-(2-pyridyl)-bicyclo [2,2,1] heptane (20 g., 0.115 mole) is dissolved in acetic acid (150 ml.) and 5% platinum oxide on carbon catalyst (2 g.) is added. The mixture is hydrogenated at room temperature and 40 p.s.i. Total hydrogen uptake occurs within 20 hours. The acetic acid is removed in vacuo. Ether is added and the hydrochloride salt is prepared by the introduction of gaseous hydrogen chloride. The salt is recrystallized from ethanol-ether to yield 21.5 g. (87%) of colorless crystals, M.P. 258–260° C.

Analysis.—Calculated for $C_{12}H_{12}NCl$: C, 66.78%; H, 10.28%; Cl, 16.45%. Found: C, 66.67%; H, 10.14%; Cl, 16.41%.

Treatment of the product with ethylene chlorohydrin yields 2-[N-(2-hydroxyethyl)-2-piperidyl]-bicyclo [2,2,1] heptane which, upon reaction with thionyl chloride yields 2 - [N - (2 - chloroethyl) - 2 - piperidyl] - bicyclo [2,2,1] heptane.

EXAMPLE 2

2-[N-(1-cyanomethyl)-2-piperidyl]-bicyclo [2,2,1] heptane 2-(2-piperidyl)-bicyclo [2,2,1] heptane (32 g., 0.179 mole) is mixed with 70% glycolonitrile (15.3 g.) and 60 ml. of water and refluxed for 1 hour. After cooling the mixture is extracted with methylene chloride and the product obtained by vacuum distillation. Yield: 24 g. (75%) of clear liquid, B.P. 148–150° C./2 mm. Hg.

Treatment of the product with concentrated aqueous sodium hydroxide yields 2-[N-(2-carboxyethyl)-2-piperidyl]-bicyclo [2,2,1] heptane.

EXAMPLE 3

2-[N-(2-aminoethyl)-2-piperidyl]-bicyclo [2,2,1] heptane

2 - [N - (1 - cyanomethyl) - 2 - piperidyl] - bicyclo [2,2,1] heptane (24 g., 0.11 mole) is dissolved in ether (150 ml.) and added dropwise to a solution of lithium aluminum hydride (6 g., 0.158 mole) in ether (200 ml.). The solution is then refluxed overnight. The solution is then cooled and to it is added dropwise water (6.36 ml.), 20% sodium hydroxide (4.8 ml.) and water (22.0 ml.). The solution is filtered after stirring for one hour, the filtrate dried over anhydrous magnesium sulfate and the hydrochloride salt made in ether. Yield: 12 g. (37%) white crystalline solid, M.P. 260°–261° C.

*Analysis.*—Calculated for $C_{14}H_{28}N_2Cl_2$: C, 56.94%; H, 9.56%; Cl, 24.02%. Found: C, 56.73%; H, 9.32%; Cl, 24.21%.

EXAMPLE 4

2-[N-(2-guanidinoethyl)-2-piperidyl-bicyclo [2,2,1] heptane

2-[N-(2-aminoethyl)-2-piperidyl-bicyclo [2,2,1] heptane dihydrochloride (6 g., 0.0207 mole) is converted to the free base and mixed with S-methylisothiourea sulfate (2.83 g., 0.0107 mole) and water (70 ml.) and the mixture is refluxed overnight. Crystals form on cooling and the mixture is then reduced to dryness. The residue is dissolved in ethanol and anhydrous ether is added to induce crystallization. Yield is 4 g. (53%) of white crystalline solid, M.P. 233°–236° C.

EXAMPLE 5

2-(N-methyl-2-piperidyl)-bicyclo [2,2,1] heptane 2-(2-pyridyl)-bicyclo [2,2,1] heptane (5 g., 0.0289 mole) are dissolved in 50 ml. of acetone and methyl iodide (10 ml.) is added. After gentle heating crystals of the quaternary 2-[2-1-methylpyridinium]bicyclo [2,2,1] heptane iodide form and are recovered and recrystallized. The yield is 7.4 g. (81%) of colorless crystals, M.P. 190°–196° C.

The quaternary thus formed (13 g., 0.0412 mole) is mixed with 150 ml. of ethanol, 15 ml. of diethylamine and a teaspoonful of Raney nickel. Hydrogenation is carried out overnight at 800 p.s.i. pressure. Yield is 7 g. (50%) of clear liquid, B.P. 103° C./2 mm. Hg.

Treatment of 1 gram (0.00518 mole) of the above formed 2-(N-methyl-2-piperidyl)-bicyclo [2,2,1] heptane with methyl iodide (5 ml.) in acetone (15 ml.) yields the quaternary 2-(N,N-dimethyl-2-piperidyl)-bicyclo [2,2,1] heptane iodide which is recrystallized from ethanol-ether. Yield, 1.5 g. (86%) of white crystalline solid, M.P. 230–232° C.

*Analysis.*—Calculated for $C_{14}H_{26}NI$: C, 50.11%; H, 7.81%; I, 37.84%. Found: C, 50.04%; H, 7.6%; I, 37.64%.

The subject matter which the applicants regard as their invention is particularly pointed out and distinctly claimed as follows:

1. A member selected from the group consisting of compounds of the formula

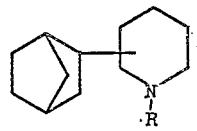

wherein R is selected from the group consisting of hydrogen, lower alkyl, hydroxy-lower alkyl, halo-lower alkyl, cyano-lower alkyl, amino-lower alkyl, carboxy-lower alkyl and guanidino-lower alkyl, and the pharmaceutically acceptable non-toxic acid addition and alkyl halide quaternary ammonium salts thereof.

2. 2-(2-piperidyl)-bicyclo [2,2,1] heptane.

3. 2-[N-(1-cyanomethyl)-2-piperidyl]-bicyclo [2,2,1] heptane.

4. 2-[N-(1-aminoethyl)-2-piperidyl] - bicyclo [2,2,1] heptane.

5. 2-[N-(1-guanidinoethyl)-2-piperidyl]-bicyclo [2,2,1] heptane.

6. 2-[N-methyl-2-piperidyl]-bicyclo [2,2,1] heptane.

References Cited in the file of this patent

UNITED STATES PATENTS

| | | |
|---|---|---|
| 2,931,805 | Weinstock | Apr. 5, 1960 |
| 3,074,961 | Poos | Jan. 22, 1963 |

UNITED STATES PATENT OFFICE
CERTIFICATE OF CORRECTION

Patent No. 3,174,973                      March 23, 1965

James W. Bolger et al.

It is hereby certified that error appears in the above numbered patent requiring correction and that the said Letters Patent should read as corrected below.

Column 5, line 45, for "190°-196° C." read -- 195°-196° C. --.

Signed and sealed this 14th day of September 1965.

(SEAL)
Attest:

ERNEST W. SWIDER                      EDWARD J. BRENNER
Attesting Officer                      Commissioner of Patents